US012532953B2

(12) United States Patent
Bchir et al.

(10) Patent No.: US 12,532,953 B2
(45) Date of Patent: Jan. 27, 2026

(54) COLOR CHART AND METHOD FOR THE MANUFACTURE OF SUCH A COLOR CHART

(71) Applicant: L'OREAL, Paris (FR)

(72) Inventors: Olfa Bchir, Chevilly Larue (FR); Fanny Bonnefond, Saint Maur des fosses (FR); Anne-Catherine Letreulle, Chevilly Larue (FR); Francoise Vincent, Chevilly Larue (FR)

(73) Assignee: L'OREAL, Paris (FR)

( * ) Notice: Subject to any disclaimer, the term of this patent is extended or adjusted under 35 U.S.C. 154(b) by 833 days.

(21) Appl. No.: 17/642,888

(22) PCT Filed: Sep. 7, 2020

(86) PCT No.: PCT/EP2020/074911
§ 371 (c)(1),
(2) Date: Mar. 14, 2022

(87) PCT Pub. No.: WO2021/052793
PCT Pub. Date: Mar. 25, 2021

(65) Prior Publication Data

US 2023/0000236 A1 Jan. 5, 2023

(30) Foreign Application Priority Data

Sep. 16, 2019 (FR) ...................................... 1910182

(51) Int. Cl.
*A45D 44/00* (2006.01)
*B41M 3/00* (2006.01)
*G09F 5/04* (2006.01)

(52) U.S. Cl.
CPC ........... *A45D 44/005* (2013.01); *B41M 3/005* (2013.01); *G09F 5/04* (2013.01)

(58) Field of Classification Search
CPC ......... A45D 44/005; B41M 3/005; G09F 5/04
(Continued)

(56) References Cited

U.S. PATENT DOCUMENTS 1,741,080 A * 12/1929 Stenz ........................ G09F 5/04 206/81
4,681,546 A * 7/1987 Hart .................. G09B 19/0023 434/102
(Continued)

FOREIGN PATENT DOCUMENTS

CN 109068826 A 12/2018
FR 1 023 251 A 3/1953
(Continued)

OTHER PUBLICATIONS

S. Lord, "What Is Delta E? dE Values and Monitors Explained", Tom's Hardware, Jul. 4, 2019, pp. 1-12 <https://www.tomshardware.com/reviews/delta-e-glossary-definition-color-monitors,6199.html>. (Year: 2019).*
(Continued)

*Primary Examiner* — Dmitry Suhol
*Assistant Examiner* — Alyssa N Brandley
(74) *Attorney, Agent, or Firm* — Oblon, McClelland, Maier & Neustadt, L.L.P.

(57) ABSTRACT

A color chart (1) for helping in the choice of a cosmetic product chosen within a range of cosmetic products having different respective hues, the color chart (1) comprising at least one transparent or translucent support (2) and, for at least one of said hues, at least one non-opaque, white-colored layer (5) and at least one non-opaque, colored layer (6), the color of which is close to that of the hue which it is desired to reproduce, superimposed on the white-colored layer (5), the white-colored (5) and colored (6) layers being printed on the transparent or translucent support (2).

18 Claims, 10 Drawing Sheets

(58) Field of Classification Search
USPC .................................................. 434/100, 104
See application file for complete search history.

(56) References Cited

U.S. PATENT DOCUMENTS

| | | | | |
|---|---|---|---|---|
| 5,178,169 | A * | 1/1993 | Lamle .................. | A45D 44/005 132/319 |
| 6,035,867 | A * | 3/2000 | Barrick ................ | A45D 44/005 206/823 |
| 6,598,608 | B1 * | 7/2003 | Downey ................ | A45D 40/30 132/319 |
| 2002/0128780 | A1 | 9/2002 | De Rigal et al. | |
| 2009/0235946 | A1 * | 9/2009 | Kalla ................... | A45D 44/005 132/200 |
| 2012/0329011 | A1 * | 12/2012 | Clark ..................... | A45D 29/00 434/100 |
| 2014/0272813 | A1 * | 9/2014 | Benshetrit ............ | A45D 44/005 434/100 |
| 2014/0368629 | A1 * | 12/2014 | Lucet-Levannier ......................... | A61B 5/1034 348/77 |
| 2015/0144581 | A1 * | 5/2015 | Ports .................... | A45D 44/005 211/59.4 |
| 2015/0279249 | A1 * | 10/2015 | Winter .................... | G09F 5/042 156/92 |
| 2016/0155367 | A1 * | 6/2016 | Rich .................... | C09D 11/037 283/81 |

FOREIGN PATENT DOCUMENTS

| | | | | |
|---|---|---|---|---|
| JP | 9-262135 | A | | 10/1997 |
| JP | 10291915 | A | * | 11/1998 |
| JP | 11272179 | A | * | 10/1999 |
| JP | 2001-112538 | A | | 4/2001 |
| JP | 2001-272276 | A | | 10/2001 |
| JP | 2002-257630 | A | | 9/2002 |
| JP | 2012-061213 | A | | 3/2012 |
| JP | 2013-212625 | A | | 10/2013 |
| TW | M499820 | U | | 5/2015 |
| WO | WO 2014/152580 | A1 | | 9/2014 |
| WO | WO 2014/170807 | A1 | | 10/2014 |

OTHER PUBLICATIONS

International Search Report mailed on Nov. 12, 2020 in PCT/EP2020/074911 filed on Sep. 7, 2020.

Preliminary French Search Report dated May 6, 2020 in French Application 1910182 filed on Sep. 16, 2019.

Chinese Office Action dated Feb. 29, 2024, issued in Chinese Patent Application No. 202080065154.2 (with English translation; Documents 1, 16-17 and 20 cited therein).

Japanese Office Action dated Apr. 18, 2023, issued in Japanese Patent Application No. 2022-517232 (with English translation; Documents 16-19 cited therein).

* cited by examiner

COLOR CHART AND METHOD FOR THE MANUFACTURE OF SUCH A COLOR CHART

TECHNICAL FIELD

The present invention relates to a color chart for helping in the choice of a cosmetic product chosen within a range of cosmetic products having different respective hues and also to a method for the manufacture of a color chart.

PRIOR ART

Ranges of cosmetic products, in particular of foundations, comprise numerous different hues. The person who wishes to choose a foundation has great difficulties in finding, at a sales outlet, the hue which corresponds to her makeup strategy, whether this is a hue which is tone by tone with her complexion or another hue.

Furthermore, as the product has a degree of transparency, the resulting color of the makeup with a foundation depends not only on the color of the latter but also on the color of the skin on which it is applied. It is thus particularly difficult for the user to choose the hue by observing the product in its container (pot, tube or bottle). The color blocks printed on the packaging or available on the corresponding sales outlet often have a very approximate color located between that in the container and a made-up color and do not solve this problem.

It is sometimes possible to test, at the sales outlet, one or more foundations. However, it is only possible to test one foundation at a time, which renders the operation tedious. It is then necessary to make a selection of the foundations beforehand in order to restrict the number of hues to be tested.

Other problems of a logistical type are posed at the sales outlets, in superstores and medium-sized stores. The advertisement of products is very important without explicit organization or personnel for advising on a choice. Color references are variable from one brand or one range to another, which does not make it possible to easily navigate between the suggestions. Packagings often have labels for indication of the color of the product which are often too small or not very realistic, which does not make it possible to thoroughly compare the color of the label with that of the skin. The artificial light of the sales outlet may also interfere with the perception of the result of the color on the skin. To these difficulties is often added the impossibility of testing the product and thus of visualizing the result of it in terms not only of color but also of texture and of coverage. The shortage of time available to the person who is choosing a cosmetic product in this context and the lack of intimacy which she may experience in choosing and testing the product should also be taken into account.

Printed color charts are known. The publication WO2014/152580 discloses a device for making a color of a cosmetic composition correspond with the hue of the skin of a person. This device comprises a strip comprising a plurality of transparent and opaque parts. The opaque parts have different shades. The opaque parts can comprise an opaque base layer, which is printed, common to all the opaque parts, on which is printed a colored layer with a hue of the shade concerned, specific to each opaque part. When the strip is placed on the skin of a person, the opaque part which has a color close to the hue of the skin become substantially invisible.

JP2001/0112538 describes a tool comprising five colored surfaces printed on transparent sheets connected together by a ring. The first of the surfaces comprises a non-opaque print of two foundation colors printed side-by-side. The other surfaces comprise a print of a base product to be put under the foundation in order to modify the effect of the foundation. Thus, by putting the first of the surfaces on the skin, the client can choose the foundation color which pleases her among the two provided, then she can superimpose this first surface with each of the other surfaces in order to be able to choose a base product as a function of the effect produced on her skin. This makes it possible for a professional to show her the advantage of the base product.

JPH11272179 describes a tool comprising several bands made from a transparent plastic sheet and each comprising several different respective skin color zones positioned side-by-side, each zone being pierced by a hole. The bands are connected together by a ring. Each band can be placed in front of the face and the skin can be seen through each hole, surrounded by the colored zone. This makes it possible for a professional to determine the color of the skin and thus to advise on a suitable foundation. These two documents describe tools which require the presence of a professional in the choice of the foundation or of a base product.

JPH09262135 describes a chart with printed colors and a hollowed zone, which makes it possible to place it in front of the skin for a comparison of the skin color with the colors of the chart.

The known color charts are generally not very ergonomic and/or not very realistic. They do not correctly reproduce the coverage and/or the color of the corresponding foundations. Furthermore, when they consist of a support with printing of colors on the support, the print can be weak and rapidly deteriorate with use.

There thus exists a need to benefit from a color chart which constitutes a tool for helping in the choice of a cosmetic product, in particular a foundation, among a range of cosmetic products provided with different respective hues, without the help necessarily of an adviser at a sales outlet, such a color chart reproducing, as faithfully as possible, the color and the coverage of the cosmetic product and being resistant to use.

ACCOUNT OF THE INVENTION

The present invention thus provides, according to one of its aspects, a color chart for helping in the choice of a cosmetic product chosen within a range of cosmetic products having different respective hues, the color chart comprising at least one transparent or translucent support and, for at least one of said hues, at least one non-opaque white-colored layer and at least one non-opaque colored layer, the color of which is close to that of the hue which it is desired to reproduce, superimposed on the white-colored layer, the white-colored and colored layers being printed on the transparent or translucent support.

By virtue of the invention, the benefit is obtained of a novel color chart which makes it possible to present the true result of the application of a cosmetic product on a person, in particular on her skin or her lips, by being positioned in front of the skin. This is because the presence of the printed non-opaque white-colored layer and of the printed non-opaque colored layer contributes to reproducing the true level of coverage obtained with the corresponding cosmetic product.

"Non-opaque" layer denotes a layer making it possible for visible light to pass through it to the point of having an effect perceptible visually by the human eye.

"White-colored layer" should be understood as meaning a white achromatic layer; the white-colored layer has a white appearance preferably under daylight ($D_{65}$ illuminant).

"Colored layer" is understood to mean a layer of non-white color.

"Transparent" denotes the absence of diffusion perceptible visually by the human eye on passing through the support. "Crystal clear" materials are examples of transparent materials.

"Translucent" denotes the presence of a diffusion perceptible visually by the human eye. The diffusion remains sufficiently weak so as not to prevent the desired effect from being obtained after application of the white-colored and colored layers.

The white-colored layer and the colored layer are preferably completely superimposed.

In a preferred embodiment, the white-colored layer is in contact with the transparent or translucent support and the colored layer is in contact with the white-colored layer, being printed on the latter. In an alternative form, the colored layer is in contact with the transparent or translucent support and the white-colored layer is in contact with the colored layer, being printed on the latter.

The delta E, dE or also ΔE is defined as a measurement of difference between two colors. The formula drawn up in 1976 by the Commission internationale de l'éclairage [International Commission on Illumination] (CIE) is as follows:

$$\Delta E=\sqrt{(L^*_2-L^*_1)^2+(a^*_2-a^*_1)^2+(b^*_2-b^*_1)^2} \quad \text{[Math 1]}$$

where:

$L^*_1$, $a^*_1$ and $b^*_1$ are the coordinates in the CIE Lab colorimetric space of the first color to be compared and $L^*_2$, $a^*_2$ and $b^*_2$ are those of the second color.

The delta E corresponds to the distance between two colors placed in this color space.

Other formulae exist for calculating this delta E (CIE 1976, CIE 1994, CIE 2000, CMC), in particular the delta E 2000 (CIE 2000) used in the context of the present invention. These novel formulae introduce coefficients for adjusting the result as a function of the hue or of the field of application (graphic arts, textiles).

The Delta E 2000 or also $\Delta E^*_{00}$, which is more accurate but also more complex, includes factors for weighting in brightness, saturation and hue, but also interactive parameters between saturation and difference in hues, in order to improve the performance qualities in terms of differences in blue colors, and also a weighting of the scale in a*, in order to optimize the performance qualities of the differences in relatively unsaturated colors.

$$\Delta E^*_{00}=\sqrt{\left(\frac{\Delta L'}{k_L S_L}\right)^2+\left(\frac{\Delta C'}{k_C S_C}\right)^2+\left(\frac{\Delta H'}{k_H S_H}\right)^2+R_T\frac{\Delta C'}{k_C S_C}\frac{\Delta H'}{k_H S_H}} \quad \text{[Math 2]}$$

$$\Delta L'=L^*_2-L^*_1 \quad \text{[Math 3]}$$

$$\bar{L}=\frac{L^*_1+L^*_2}{2} \quad \text{[Math 4]}$$

$$\bar{C}=\frac{C^*_1+C^*_2}{2} \quad \text{[Math 5]}$$

$$a'_1=a^*_1+\frac{a^*_1}{2}\left(1-\sqrt{\frac{\bar{C}^7}{\bar{C}^7+25^7}}\right) \quad \text{[Math 6]}$$

-continued $$a_2'=a^*_2+\frac{a^*_2}{2}\left(1-\sqrt{\frac{\bar{C}^7}{\bar{C}^7+25^7}}\right) \quad \text{[Math 7]}$$

$$\bar{C}'=\frac{C'_1+C'_2}{2} \quad \text{[Math 8]}$$

$$\Delta C'=C'_2 \quad \text{[Math 9]}$$

with $$C'_1=\sqrt{a'^2_1+b^{*2}_1} \quad \text{[Math 10]}$$

and $$C'_2=\sqrt{a'^2_2+b^{*2}_2} \quad \text{[Math 11]}$$

$$h'_1=a\tan 2(b^*_1, a'_1)\bmod 360° \quad \text{[Math 12]}$$

$$h'_2=a\tan 2(b^*_2, a'_2)\bmod 360° \quad \text{[Math 13]}$$

$$\Delta h'=\begin{cases} h'_2-h'_1 & |h'_2-h'_1|\le 180° \\ h'_2-h'_1+360° & |h'_2-h'_1|>180°, h'_2\le h'_1 \\ h'_2-h'_1-360° & |h'_2-h'_1|>180°, h'_2>h'_1 \end{cases} \quad \text{[Math 14]}$$

$$\Delta H'=2\sqrt{C'_1C'_2}\sin(\Delta h'/2) \quad \text{[Math 15]}$$

$$\bar{H}'=\begin{cases} (h'_1+h'_2+360°)/2 & |h'_1-h'_2|>180° \\ (h'_1+h'_2)/2 & |h'_1-h'_2|\le 180° \end{cases} \quad \text{[Math 16]}$$

$$T=1-0.17\cos(\bar{H}'-30°)+0.24\cos(2\bar{H}')+0.32\cos(3\bar{H}'+6°)-0.20\cos('\bar{H}'-63°) \quad \text{[Math 17]}$$

$$S_L=1+\frac{0.015(\bar{L}-50)^2}{\sqrt{20+(\bar{L}-50)^2}} \quad \text{[Math 18]}$$

$$S_C=1+0.045\bar{C}' \quad \text{[Math 19]}$$

$$S_H=1+0.015\bar{C}'T \quad \text{[Math 20]}$$

$$R_T=-2\sqrt{\frac{\bar{C}'^7}{\bar{C}'^7+25^7}}\sin\left[60°.\exp\left(-\left[\frac{\bar{H}'-275°}{25°}\right]^2\right)\right] \quad \text{[Math 21]}$$

The colored layer and optionally the white-colored layer are preferably such that the difference in colors between the printed color, or color as it appears on looking at the color chart as a result of the printed layers, and the hue of the corresponding cosmetic product, expressed as Delta E 2000, is preferably less than 2, better still less than 1.

"Printed color" is understood to mean the color resulting from the printing of the white-colored layer and from that of the colored layer, which are superimposed, on the transparent or translucent support, seen from the side of the colored layer. It may also be said that the printed color is the color as it appears on looking at the color chart as a result of the printed layers. The printed color is evaluated by preferably placing the support with the printed color on an evaluation device comprising a region colored white, forming a white background, in order to carry out the measurements. This same white background is advantageously used to carry out the precalibration, also known as Profil ICC, of the printer.

The level of coverage, or covering power, defines the opaqueness of a cosmetic product or of a print.

The level of coverage of a cosmetic product is evaluated by applying the cosmetic product to an evaluation device, for example a contrast card or another support, comprising at least two regions respectively colored white and black, and by measuring the respective coordinates $L^*_{black}$ on a black background and $L^*_{white}$ on a white background. Likewise, the level of coverage of the printed color can be evaluated by positioning the transparent or translucent support on the evaluation device, with $L^*_{black}$ and $L^*_{white}$ respectively measured on a black background and on a white background.

The level of coverage corresponds to the contrast ratio (CR %) according to the formula:

$$CR\,\% = \frac{Y_{black}}{Y_{white}} * 100 = \left(\frac{L^*_{black} + 16}{L^*_{white} + 16}\right)^3 * 100 \quad \text{[Math 22]}$$

The colored layer and the white-colored layer are preferably such that the difference in level of coverage between the printed color and the applied layer of the cosmetic product of the corresponding hue, expressed as contrast ratio CR %, is preferably less than or equal to ±15%, in particular less than or equal to ±10%.

The white-colored and colored layers preferably originate from the printing of inks, in particular of solvent-based inks, of eco-solvent inks type. The white-colored layer originates from a printing of a white-colored ink. It can make it possible to adjust the hue and/or the coverage of the printed color on the transparent or translucent support. For example, in order to increase the coverage, this white-colored layer is applied in several superimposed passes.

The color chart can comprise a plurality of transparent or translucent supports, which are connected together, in particular by a pivot, the transparent or translucent supports preferably being printed with respective colored layers of different colors.

In an alternative form, when the color chart comprises a plurality of transparent supports, one and the same support can comprise colored layers of different colors.

Said at least one transparent or translucent support comprises, for example, a flexible polymer film or a rigid or semirigid polymer sheet, said at least one transparent or translucent support comprising at least one polymer chosen from a polyethylene, a polyacrylic, a polyvinyl chloride (PVC), a polyester, a polycarbonate or a polyethylene terephthalate (PET), preferably a PET. PET may be preferred for its possibility of being recycled, in comparison with other polymers, such as PVC.

The transparent or translucent support can, in an alternative form, comprise a transparent paper.

The white-colored and colored layers preferably form at least one pattern and/or at least one opening on the transparent or translucent support, in order to make it possible to see through the transparent or translucent support, in zones devoid of white-colored and colored layers. If appropriate, the opening is obtained by cutting the support.

The patterns and/or the openings make it possible, on superimposing the color chart on the skin, to see the latter through the bare transparent or translucent support, beside the colored layer, which makes it possible to have, side-by-side, the color of the skin and the color and the effect of the foundation on the skin and facilities the perception of the difference in color. Furthermore, the patterns and/or the openings can contribute to the attractiveness of the color chart.

The pattern(s) can be geometric or non-geometric, be uniformly or non-uniformly distributed, represent flowers, arabesques, stars or other patterns, and occupy the entire printed surface or only a portion of the latter.

The opening(s) may or may not be identical to one another, be equidistributed, be distributed randomly or geometrically, or form or not form part of patterns.

The color chart can take varied forms, and in particular be in a form chosen from the group consisting of a roll, a bracelet, a forehead mask, a retaining ring, a flower with petals, a detachable page, in particular magazine page, and a portion of a packaging, in particular of a box or of a blister pack.

The color chart can comprise at least one layer of a varnish covering all of the superimposed white-colored and colored layers, on the opposite side from the transparent or translucent support. Such a varnish can protect the white-colored and colored layers and improve the resistance to use of the color chart. The varnish can be matt, glossy or satiny, or confer another appearance. The varnish is preferably colorless. This makes it possible not to modify the color of the assembly of layers. The varnish can modify the color of the print. In the case of its use and in the case where it modifies, even slightly, the color, the measurements can be carried out as for the printed color, an evaluation also known as color calibration, this evaluation incorporating the impact of the varnish, that is to say involving redoing the ICC profile.

In an alternative form, a transparent film or sheet, made of the same material or of a material other than the transparent or translucent support, can cover the white-colored and colored layers, on the opposite side from the transparent or translucent support. Such a film or sheet can protect these layers without modifying the colored effect thereof or modifying the visibility through the color chart.

The range of different hues of the cosmetic products can comprise at least ten different hues, indeed even more than twenty hues, in particular more than thirty hues, for example thirty-eight hues.

It should be noted that the color chart makes it possible to simulate the hue and the coverage of different cosmetic products after application to the skin and is targeted as being the most faithful possible to the result obtained with these cosmetic products. The color chart of the invention makes it possible to obtain this desired faithfulness, which is evaluated and confirmed during its conception.

A further subject matter of the present invention, according to another of its aspects, in combination with or independently from all or part of that which precedes and follows, is a color chart for helping in the choice of a cosmetic product chosen within a range of cosmetic products having different respective hues, the color chart comprising at least one transparent or translucent support and, for at least one of said hues, at least one non-opaque layer printed on the translucent or transparent support, comprising a white-colored ink and at least one colored ink, which is non-opaque, the color of this layer being close to that of the hue which it is desired to reproduce.

Range of Color Charts

The invention also relates, according to another aspect, in combination with that which precedes, to a range of color charts, comprising a plurality of color charts as defined above, each color chart comprising a range of hues.

According to this aspect, the hues are grouped together by ranges of hues within a color chart. It is then possible to create several different color charts, each color chart comprising several hues similar to one another. It is thus possible to create one or more color charts with hues of light colors, one or more color charts with hues of intermediate colors and one or more color charts with hues of dark colors. For example, among 40 hues studied, the Delta E 2000 between the lightest hue and the darkest hue of all the hues is 35 and the Delta E 2000 of the hues of a range of hues is between 5 and 15. These Delta E 2000 values can vary in another range.

The existence of a range of color charts makes it possible to choose the color chart(s) corresponding to the complexion of the skin or to the makeup strategy, for example. Light skins can choose one or more color charts with light-colored layers, while dark skins can choose one or more color charts with dark-colored layers. Each color chart can comprise between two and ten different hues, indeed even between two and eight different hues, for example comprise seven different hues. This makes it possible to exclude in advance the obviously inappropriate hues and to restrict the choice to appropriate hues, in advance, before using the color chart.

Method for the Manufacture of a Color Chart

A further subject matter of the present invention, according to another aspect, in particular taken in combination with that which precedes, is a method for the manufacture of a color chart in particular as defined above, comprising the following stages, carried out for at least one of said hues:

a) printing, on a transparent or translucent support, a non-opaque, white-colored layer,
b) printing, in particular after drying the white-colored layer, a non-opaque, colored layer, the color of which is similar to that of the hue which it is desired to reproduce, superimposed on the white-colored layer on the transparent or translucent support.

The color of the colored layer superimposed on the white-colored layer can be such that the Delta E 2000 between the printed color and the color of the corresponding hue of the cosmetic product on application is less than 2, in particular less than 1.

The thickness of the white-colored layer and/or the color of the colored layer can be chosen so that the difference in level of coverage between the printed layer and the applied layer of the cosmetic product of the corresponding hue, expressed as difference in contrast ratio CR %, is preferably less than or equal to ±15%.

The printing stages a) and b) are carried out in this order, preferably. Alternatively, the stages a) and b) are carried out in the order b) followed by a).

The objective of the method for the manufacture of the color chart is to simulate, on the color chart, the color and the coverage of the real cosmetic product once applied to the skin, in particular the hand, the face or the neck.

The method can comprise a stage of addition of at least one layer of varnish to the colored layer.

The white-colored and colored layers are preferably printed so as to be completely superimposed, for each hue.

The method can employ, for the printing in stages a) and b), an inkjet printer comprising a white ink, preferably a solvent-based, in particular eco-solvent-based, inkjet printer.

The printer chosen for the printing of the white-colored and colored layers is advantageously a digital printer. It is preferably of high quality.

The printer is preferably chosen so as to produce a print which is not easily damaged or only slightly damaged during use.

One advantage of solvent-based, in particular eco-solvent-based, inkjet printers is that they make it possible to obtain a stronger printed color than inkjet printers having water-based inks.

It is possible to choose, for example, for the printing of the white-colored and colored layers on the transparent or translucent support of the color chart, an inkjet printer having an eco-solvent ink, comprising a white ink, sold by Epson.

Use is preferably made of a single printer for the printing of the white-colored layer and the printing of the colored layer. In an alternative form, two different printers are used.

The printer used can comprise a printhead for printing the white layer and another printhead for printing the colored layer. The layers are printed successively. The white layer has then had the time to dry when the colored layer is printed.

In an alternative form, the printer used for the printing can comprise a single printhead which prints first the white layer and then the colored layer. In this case, it may be that the white layer does not have the time to dry when the colored layer is printed. An at least partial mixing of the white and colored layers may then take place on the support. It is thus possible to obtain, in this case, a color chart as defined above for helping in the choice of a cosmetic product chosen within a range of cosmetic products having different respective hues, the color chart comprising at least one transparent or translucent support and, for at least one of said hues, at least one non-opaque layer printed on the translucent or transparent support, comprising a white-colored ink and at least one colored ink, which is non-opaque, the color of this layer being close to that of the hue which it is desired to reproduce. Such an alternative printing form with a single printhead is suitable instead for production of the color charts on a non-industrial scale. It should be noted that one and the same printer can carry out both ways of printing with one printhead and two printheads.

A computer tool which makes the connection between computer data and actionable data for printing, also known as RIP (Raster Image Processor), consisting of specialized software, the objective of which is to manage the printing and to replace the driver, can be used. Such specialized software in printing is preferably chosen for its ability to precisely print L*, a* and b* colorimetric data. The software known under the Caldera name can be chosen in order to increase in particular the quality of the color printout but also the productivity and the profitability.

The printing stages a) and b) can comprise producing prints with at least one pattern and/or opening.

As already mentioned, the printing carried out on the color chart during the method for the manufacture of the color chart according to the invention has the objective of simulating the color and the coverage of a cosmetic product, in particular of a foundation, once applied to the skin.

In order to achieve this objective, the method can comprise the preliminary stage consisting in printing the same hue with different levels of coverage.

The method can comprise the stage consisting in printing, on a transparent or translucent support, white-colored layers of different thicknesses and, on each of these, in printing a colored layer of the color of the cosmetic product which was measured on the white region of the evaluation device.

The method can comprise the stage consisting in arranging the transparent or translucent support with a printed white-colored layer and a printed colored layer on the evaluation device, on the regions respectively colored white and black, and in carrying out at least one measurement, in particular of reflectance, on the colored layer in order to calculate the color and optionally the level of coverage of the printed color on the transparent or translucent support. This makes it possible to confirm, by comparison, if the level of coverage, or covering power, approaches, preferably to ±15%, the level of coverage of the cosmetic product, in particular of the cosmetic product applied to the evaluation device, which level of coverage was determined beforehand, as explained above.

Furthermore, the printed color on the transparent or translucent support measured, in particular on a white background of the evaluation device, is compared with the target color of the cosmetic product of corresponding hue, in particular measured on the evaluation device. This makes it possible to confirm if the printed white-colored and colored layers on the transparent or translucent support are such that the Delta E 2000 between the printed color on the transparent or translucent support and the target color of the cosmetic product measured on the evaluation device is less than 2, better still less than 1.

In order to adjust the color and/or the coverage of the printed color in order for them to be within the target values for coverage and for color as for example indicated above, the method can comprise the following stages:

(a') applying a cosmetic product of one of said hues to an evaluation device comprising at least two regions respectively colored white and black, in particular in a thickness of between 5 and 50 μm, more preferentially between 5 and 20 μm, (b') carrying out at least one measurement, in particular of reflectance, on the two regions, so to calculate the level of coverage and the color of the hue on the evaluation device, (c') carrying out at least one printing, on the or a transparent or translucent support, of a non-opaque white-colored layer, with a different thickness, and printing a non-opaque colored layer, the color of which is similar to that of the hue which it is desired to reproduce, superimposed on the white-colored layer on the transparent or translucent support, (d') positioning the transparent or translucent support comprising the printed layers on at least the region colored white of a virgin evaluation device and carrying out at least one measurement, in particular of reflectance, on the colored layer in order to calculate the color and optionally the level of coverage of the colored layer superimposed on the white-colored layer on the transparent or translucent support, (e') comparing the levels of coverage and colors calculated in stages b') and d'), so as to calculate the Delta E 2000 and/or the contrast ratio % CR between the hue of the applied cosmetic product and the printed color, (f') choosing, for at least said hue or for an assembly of hues, a thickness of the white-colored layer and/or adjusting the printing color of the colored layer so that the Delta E 2000 is less than 2, preferably less than 1, and/or that the difference in contrast ratio % CR is less than or equal to ±15%, in order to produce the color chart.

It is possible to carry out stages c') to f') several times on a virgin support, or on a virgin part of the support, with each time a different thickness of white-colored layer. In order to do this, the number of passes of printing the white-colored layer is modified in order to vary the thickness. This makes it possible to choose, among several, the thickness of the white-colored layer which gives the result closest to reality, in particular in terms of level of coverage. One and the same thickness of white-colored layer can be chosen for several different hues which are preferably close to one another.

The color on a white background is preferably systematically checked in order to compare the printed color and the color of the target foundation on application on a white background. For the coverage, the checking can take place on a selection of products from the entire range by adding the reflectance on a white and black background of a contrast card, for example.

The evaluation device, which comprises at least two regions respectively colored white and black, can be chosen from the group consisting of a synthetic material, in particular synthetic skin, a cardboard sheet, in particular for producing a contrast card. The evaluation device preferably reproduces the skin microrelief.

The evaluation device can be as described in the international application WO 2014/170807. In particular, it can comprise an application surface defined by a multilayer complex comprising a skin layer and an underlying support layer made of elastomer.

In an alternative form, the evaluation device can be that known under the Bioskin brand, sold by Beaulax, composed of a multilayer structure comprising two layers of PU elastomer.

The evaluation device can also be chosen from silicone or rubber prostheses, skin-mimicking supports made of polyurethane (PU), biological supports, such as reconstructed skin, intestines, and rough PMMA supports.

During stage b'), the method can comprise the heating and temperature maintenance at a temperature of between 30° C. and 40° C. of the evaluation device.

During stage b'), the spectral reflectance can be measured on the regions respectively colored white and black, using a spectrophotometer, so as to obtain, for each hue, the L*, a* and b* measurements on the regions colored white and black in D65 (illuminant). It is possible, for example, to use a spectrophotometer known under the VS450 name sold by X-Rite, with the 45°/0° measurement configuration. The spectrophotometer can be another device for measurement of the color with a 45°/0° or diffuse/8° configuration.

After measurement of the reflectance, it is possible to calculate the level of coverage of the cosmetic product, in particular of the foundation, for the hue under consideration, the level of coverage or the opacity corresponding to the contrast ratio % CR according to the formula [Math 22] recalled above.

The method can also comprise a stage of visual confirmation by the application to the skin or to one or more skin-colored supports. Such a stage can consist in spreading the cosmetic product, in particular the foundation, over a skin or a skin-colored support with a complexion corresponding substantially to the hue of the foundation, in then comparing, under standardized observation conditions, with the printed color on the transparent or translucent support of the same hue positioned on the skin and finally in validating the print if the latter corresponds to the visual rendition of the foundation. If this is not the case, the method can comprise the stage consisting in adjusting the coverage or in modifying the printed color. Standardized observation conditions is understood to mean lighting of a light booth with diffuse D65 lighting.

A further subject matter of the present invention, according to another aspect, taken in combination with all or part of that which precedes, is a method for the manufacture of a color chart as defined above for helping in the choice of a cosmetic product chosen within a range of cosmetic products having different respective hues, the color chart comprising at least one transparent or translucent support and, for at least one of said hues, at least one non-opaque layer printed on the translucent or transparent support, comprising a white-colored ink and at least one colored ink, which is non-opaque, the color of this layer being close to that of the hue which it is desired to reproduce, the method comprising the following stages, carried out for at least one of said hues:

a) printing, on a transparent or translucent support, a non-opaque, white-colored layer, b) printing a non-opaque colored layer, the color of which is similar to that of the hue which it is desired to reproduce, superimposed on the white-colored layer on the transparent or translucent support.

According to this method, the method can use a printer for the printing which comprises a single printhead which prints first the white layer and then the colored layer. Such a method with a single printhead on the printer is suitable instead for production of the color charts on a non-industrial scale. It may be that the drying of the white layer is not complete when the colored layer is printed and that there is, for this reason, an at least partial mixing of the white and colored inks on the support.

Method for the Selection of a Cosmetic Product

The invention also relates, according to another aspect, in combination with that which precedes, to a method for the selection of a cosmetic product within a range of cosmetic products having different respective hues, using a color chart according to the invention as defined above, comprising the following stages:

superimposing the color chart on the skin, in particular of the face, of the hand or of the arm, observing the color chart thus superimposed on the skin, choosing the hue and thus the corresponding cosmetic product, in particular as a function of the user's makeup strategy.

When a range of color charts is available, such a method can comprise the preliminary stage consisting in choosing a color chart within the range presented, in particular in order to correspond to the user's complexion or makeup strategy.

As each hue of the color chart is located by an identifier, as well as the cosmetic products, the method can comprise the selection of the product which has the same identifier as the selected hue of the color chart.

Cosmetic Product

The cosmetic product is intended for making up and/or for caring for the skin or lips, preferably the skin.

The cosmetic product is advantageously a foundation. It can also consist of a lipstick.

The cosmetic product can be in a liquid, pulverulent or pasty form.

The cosmetic product can comprise pigments, dyes, colored lakes and multilayer interference particles, inter alia.

Assemblies

A further subject matter of the invention, according to another of its aspects, in combination with that which precedes, is an assembly of a range of cosmetic products with different respective hues and of at least one color chart as defined above or of a range of color charts as defined above.

A further subject matter of the invention, according to another of its aspects, in combination with that which precedes, is an assembly of a color chart as defined above and of a tailor-made formulation device which is capable of carrying out the formulation of the cosmetic product, the hue of which has been chosen subsequent to the use of the color chart.

A further subject matter of the invention, according to another of its aspects, in combination with that which precedes, is an assembly comprising a cosmetic product and a transparent or translucent support printed with a white-colored layer and a colored layer, so as to visualize the effect of the cosmetic product applied to the skin. This support can form part of the packaging of the product or be arranged outside.

BRIEF DESCRIPTION OF THE DRAWINGS

A better understanding of the invention will be able to be obtained on reading the detailed description which will follow of non-limiting implementational examples thereof, and on examining the appended drawing, in which.

DETAILED DESCRIPTION

In the continuation of the description, elements which are identical or which have identical functions carry the same reference marks. For the purposes of conciseness of the present description, they are not described for each of the figures, only the differences between the embodiments being described.

Figure 2:
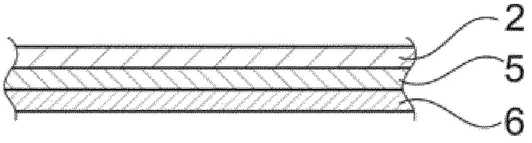
FIG. 2 is a diagrammatic and partial sectional view of the color chart of FIG. 1.

In the figures, and in particular FIG. 2, the true proportions have not been adhered to, for the sake of clarity.

Figure 1:
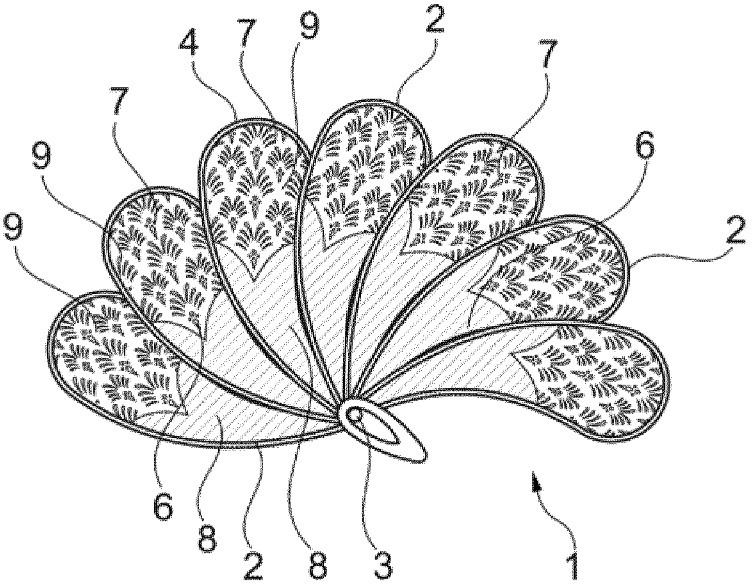
FIG. 1 is a diagrammatic perspective view of an example of a color chart according to the invention.

There has been illustrated, in FIG. 1, a color chart 1 in accordance with the invention for helping in the choice of a cosmetic product chosen within a range of cosmetic products having different respective hues. In the example illustrated, the cosmetic products are foundations for making up and/or caring for the skin.

The color chart 1 comprises at least one, better still a plurality of transparent supports 2, numbering seven in this example, in the form of petals of the same shape, connected together at one end by a pivot-forming axle 3, around which the transparent supports can rotate. In a storage configuration, all the transparent supports 2 can be superimposed, while, in a configuration of use represented in FIG. 1, all the transparent supports 2 are not superimposed on one another and form as a flower, around the axle 3.

Each transparent or translucent support 2 comprises a sheet, at least partially rigid, made of polymer material, in this example made of polyethylene, which is transparent, with a thicker rim 4 forming the circumference of the transparent or translucent support 2.

The thickness of the transparent or translucent support 2, apart from the rim 4, is between 2 mm and 3 mm in this example.

The color chart 1 comprises, printed on the transparent or translucent support 2, a non-opaque, white-colored layer 5 and a non-opaque, colored layer 6, superimposed on the white-colored layer 5, as can be seen in FIG. 2.

The printing, in this example, of the white-colored layer 5 on the transparent or translucent support and then of the colored layer 6 on the white-colored layer is carried out by an eco-solvent inkjet printer, by the printer sold by Epson under the reference Surepress L-4533 AW.

In FIG. 1, the colored side, corresponding to the color of the colored layer 6, of the transparent supports 2 is displayed, the white-colored layers 5 and the colored layers 6 being completely superimposed in this example. If the color chart 1 is turned over, the white color of the white-colored layer 5 will be displayed.

For each transparent or translucent support 2, a single color is printed for the colored layer 6. The printed color has a color is close to the target color of the hue of the cosmetic product which it is desired to reproduce, the Delta E 2000 between these two colors being, in this example, less than 2.

The seven transparent supports 2 of the color chart 1 make it possible to reproduce seven different hues of cosmetic products.

As may be seen in FIG. 1, the white-colored layers 5 and the colored layers 6 form at least one pattern and/or at least one opening, in this example several patterns 7, on the transparent or translucent support 2. The patterns 7, in this embodiment, represent stylized plant patterns. The transparent supports 2 each comprise an unbroken printing zone 8, without openings, close to the axle 3, and patterns 7 putting in zones 9 devoid of white-colored layers 5 and colored layers 6, in order to make it possible to see through the transparent or translucent support 2 in these zones 9. The printing is carried out so as to form these patterns 7. In this example, all the transparent supports 2 of the color chart 1 are coated with prints of the same patterns 7 but it might be any other way without departing from the scope of the invention.

Figure 3:
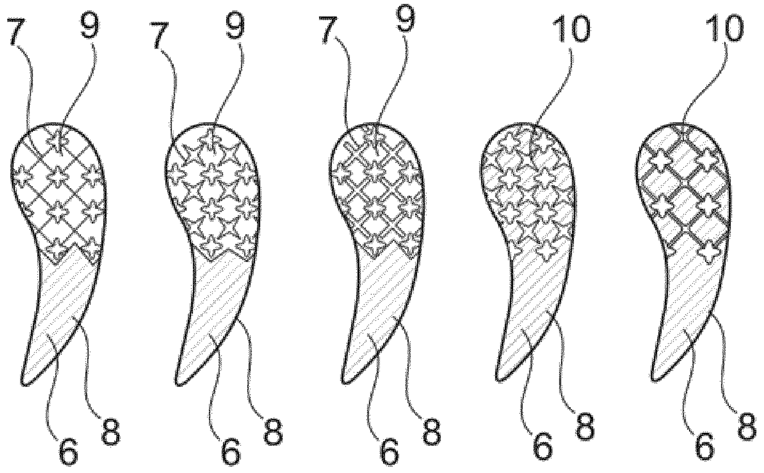
FIG. 3 represents a diagrammatic view of an example of patterns for producing the color chart of FIG. 1.

There have been represented, in FIG. 3, examples of printings of colored layers 6 having patterns 7 or openings 10, which can replace those of FIG. 1 for each of the transparent supports 2.

FIGS. 4 to 10 partially and diagrammatically represent other examples of printings of colored layer 6 and of white-colored layer 5, putting in patterns 7 and/or openings 10.

Figure 4:
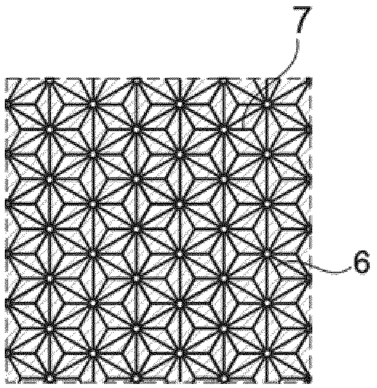
FIG. 4 is a diagrammatic view of another example of pattern for producing the color chart according to the invention.
Figure 5:
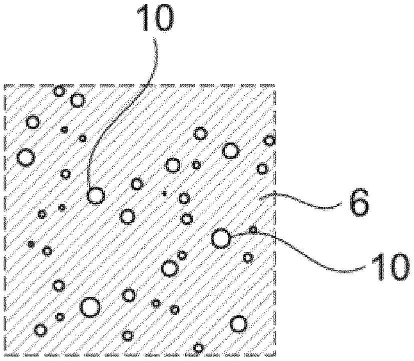
FIG. 5 is a diagrammatic view of another example of pattern for producing the color chart according to the invention.
Figure 6:
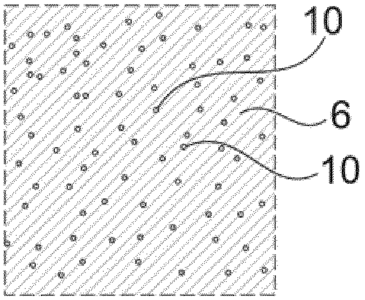
FIG. 6 is a diagrammatic view of another example of pattern for producing the color chart according to the invention.
Figure 7:
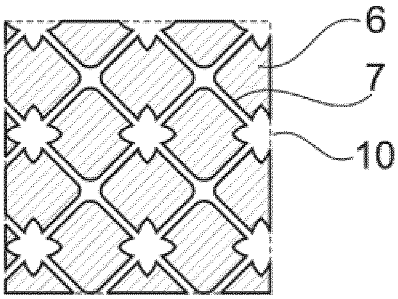
FIG. 7 is a diagrammatic view of another example of pattern for producing the color chart according to the invention.
Figure 8:
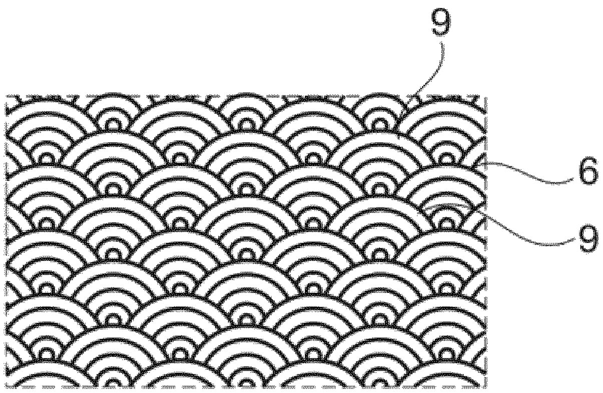
FIG. 8 is a diagrammatic view of another example of pattern for producing the color chart according to the invention.
Figure 9:
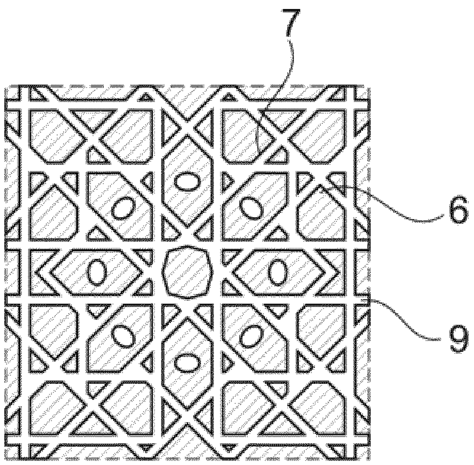
FIG. 9 is a diagrammatic view of another example of pattern for producing the color chart according to the invention.
Figure 10:
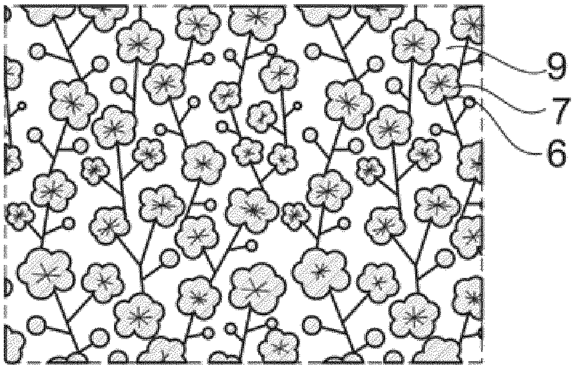
FIG. 10 is a diagrammatic view of another example of pattern for producing the color chart according to the invention.

The patterns 7 and/or openings 10 can be distributed randomly or in an organized manner, in particular geometric manner. In FIG. 4, geometric patterns 7 forming a grid layout of stars, at the center of which openings 10 having a greater diameter are formed, are displayed. In FIG. 5, openings 10 having a relatively large size are randomly distributed. In FIG. 6, the openings 10 are small in size, distributed randomly and densely. In FIG. 7, a grid pattern 7 with larger openings 10 at certain intersections is displayed. FIG. 8 represents geometric patterns 7 evoking waves leaving many transparent zones 9 between them. FIG. 9 represents a square having geometric patterns 7, while FIG. 10 represents a network of flower patterns 7.

All the patterns 7 and openings 10 represented in FIGS. 4 to 10 can replace all or part of the printed part of the transparent support(s) 2 of the color chart 1.

Figure 11:
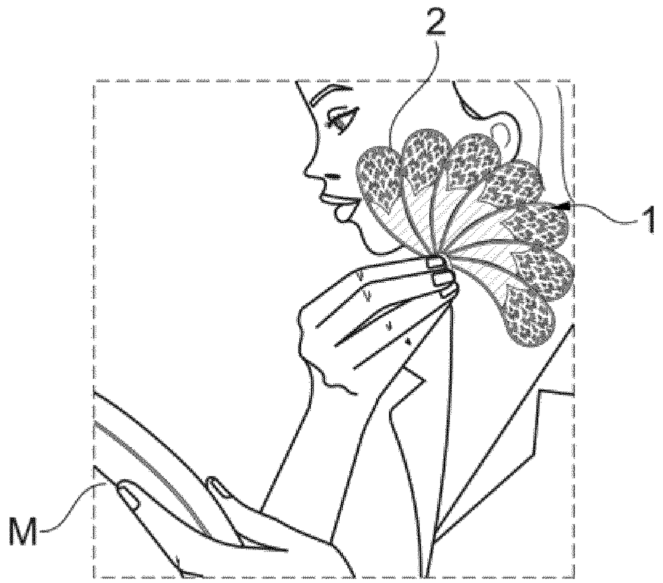
FIG. 11 is a diagrammatic view illustrating a possible use of the color chart of FIG. 1.
Figure 12:
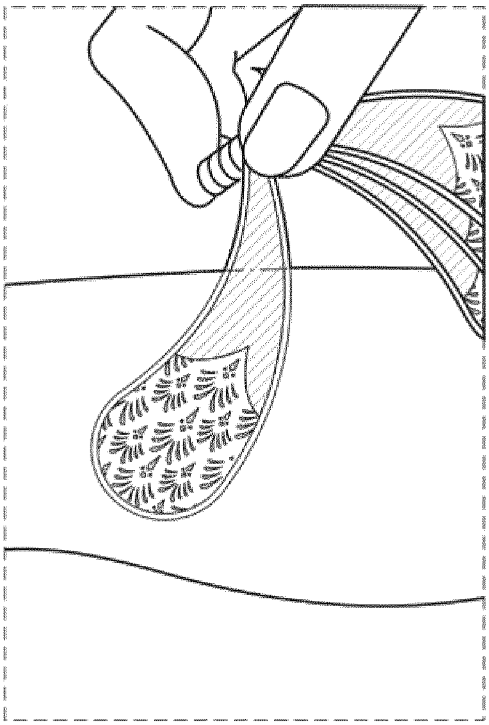
FIG. 12 is a diagrammatic view illustrating another possible use of the color chart of FIG. 1.

The use of the color chart 1 of FIG. 1 has been illustrated in FIGS. 11 and 12. In FIG. 11, there is displayed a woman holding, in one hand, a mirror M and, in the other hand, at the axle 3, the color chart 1, so as to superimpose at least one transparent support 2, indeed even several transparent supports 2, on the skin of her face while looking at herself in order to be able to choose the color which suits her the best, as a function of her complexion and/or of her makeup strategy, and thus the associated cosmetic product, of similar hue. She can rotate the color chart 1 or the transparent supports 2 in order to superimpose them on her skin in turn and to look at the result produced.

In FIG. 12, the color chart is used on the internal part of the forearm, the person superimposing an element of the color chart on the skin at this spot in order to see the color effect of cosmetic product of the hue concerned. She can superimpose, in turn or simultaneously, all of the colors carried by the different transparent supports 2 in order to choose a hue and thus a cosmetic product which suits her.

The color chart 1 according to the invention can be used autonomously, without the help of an expert, and with good results because the color rendition and coverage of the color chart is very similar to that of the associated foundation, of the same color.

Figure 13:
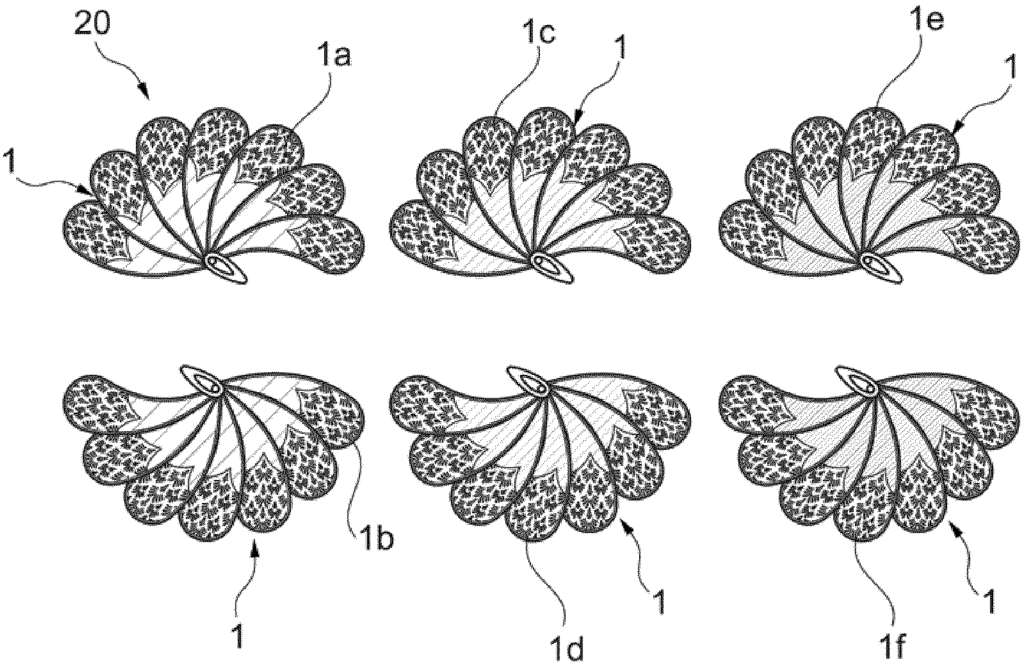
FIG. 13 represents, diagrammatically and in perspective, a range of color charts according to the invention.

FIG. 13 illustrates the possibility of having available a plurality of color charts, in the form of a range 20 of color charts 1 numbered 1*a*, 1*b*, 1*c*, 1*d*, 1*e* and 1*f*. Each color chart 1 comprises a range of similar hues. In this figure, six color charts 1 similar to that of FIG. 1, each comprising six or seven transparent supports 2, thus six or seven different hues, are displayed. The color charts referenced 1*a* and 1*b* have light hues, the color charts referenced 1*c* and 1*d* have intermediate hues and the color charts referenced 1*e* and 1*f* have dark hues. The user will choose, as a function of her complexion or of her makeup strategy, one, two or three suitable color charts 1. For example, a person with a light complexion can choose the color charts 1*a* and 1*b*.

Figure 22:
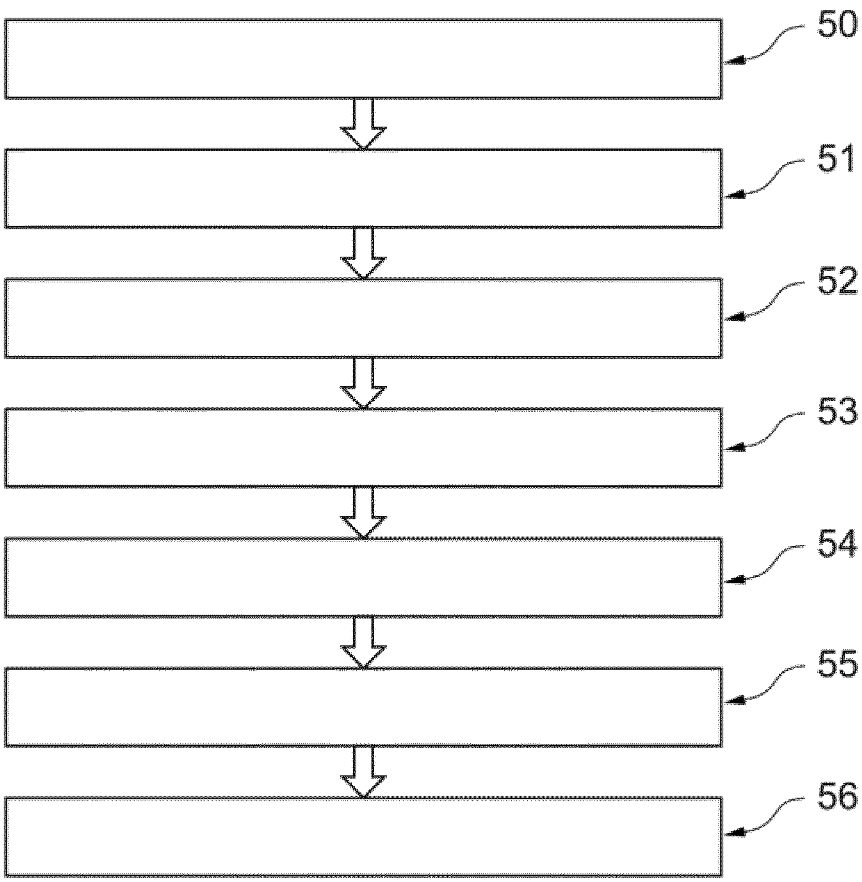
FIG. 22 represents, in the form of a block diagram, different stages of an example of a method for the manufacture of a color chart according to the invention.

For the production of the color chart 1, use may be made of the following method, the stages of which are illustrated in FIG. 22.

First of all, in a first stage 50, from a range of cosmetic products of respective hues, a cosmetic product of one of said hues is chosen and is applied to an evaluation device comprising at least two regions respectively colored white and black. In this example, the evaluation device is as described in the international application WO 2014/170807 and comprises an application surface defined by a multilayer complex comprising a skin layer and an underlying support layer made of elastomer.

In a stage 51, after drying the applied product, at least one measurement of reflectance is carried out on the two regions, respectively colored white and black, so as to calculate the level of coverage and the color of the hue on the evaluation device.

In a stage 52, which can be carried out before, during or after stages 50 and 51, the non-opaque white-colored layer 5 is printed, preferably with a predetermined thickness and/or with a predetermined number of printing passes, on the transparent or translucent support 2.

In a stage 53, the non-opaque colored layer 6, the color of which is similar to that of the hue which it is desired to reproduce, is printed, superimposed on the white-colored layer 5, on the transparent or translucent support 2. The printing, in this example, of the white-colored layer 5 on the transparent or translucent support and then of the colored layer 6 on the white-colored layer is carried out by an eco-solvent inkjet printer, for example the printer sold by Epson under the reference Surepress L-4533 AW.

In a stage 54, the transparent or translucent support 2 comprising the printed layers is positioned on at least the region colored white of an evaluation device similar to that mentioned above but virgin, and a measurement of reflectance is carried out on the colored layer 6 in order to calculate the level of coverage and the color of the printed layer.

The measurements of reflectance are carried out using a spectrophotometer known under the VS450 name sold by X-Rite, with the 45°/0° measurement configuration.

It is possible, in a stage 55, to compare the levels of coverage and colors calculated in stages 51 and 54, so as to calculate the Delta E 2000 and/or the contrast ratio % CR between the hue of the applied cosmetic product and the printed color.

Stages 52, 53, 54 and 55 can be repeated, at least once, for one and the same hue, with a different white-colored layer thickness. This makes it possible, in the end, to choose the white-colored layer thickness which makes it possible to obtain the lowest Delta E 2000 and/or the closest contrast ratio % CR. The Delta E 2000 is less than 2 and the difference in contrast ratio % CR is less than ±15%.

Stages 52, 53, 54 and 55 can also be repeated, at least once, with different hues of colors for the colored layer 6 in order in particular to have the lowest Delta E 2000.

In a final stage 56, the choice is made of the transparent or translucent support 2 with the white-colored layer 5 of appropriate thickness and the colored layer 6 of appropriate hue, in order to produce the color chart 1.

There have also been represented, in FIGS. 14 to 21, other examples of color charts 1 in accordance with other implementational examples of the invention.

Figure 14:
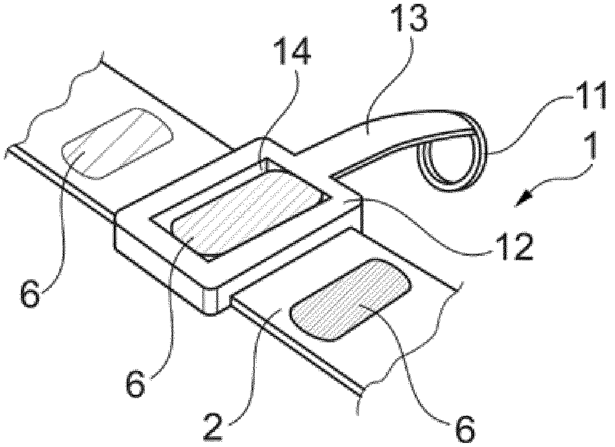
FIG. 14 represents, partially, diagrammatically and in perspective, another example of color chart according to the invention, FIG. 15 diagrammatically represents the use of the color chart of FIG. 14.
Figure 15:
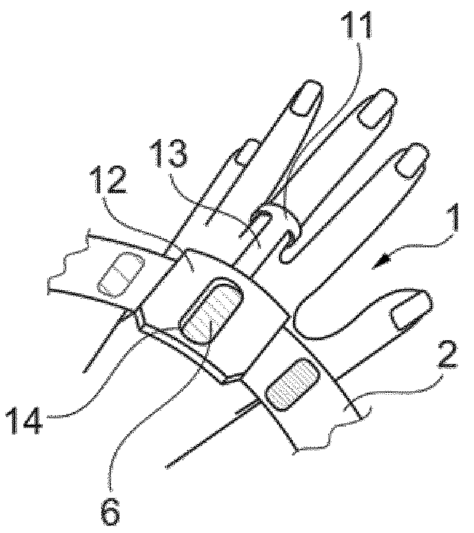

In FIGS. 14 and 15, the color chart 1 takes the form of a retaining ring, with a ring part 11 connected to a support part 12 by a rigid link 13. The support part 12 consists of a frame with a traversing window 14, the frame being open laterally to make it possible to forwardly progress the color chart 1 comprising a transparent or translucent support 2 in the form of a strip, made of a flexible polymer film, with, at regular intervals, prints of colored layers 6, which are visible, on white-colored layers, which are not visible, of different colors, and of a shape suited to the shape of the window 14. Thus, as can be seen in FIG. 15, a user can slip on the ring part 11 so that the window 14 is superimposed on the back of her hand and that she can cause the transparent or translucent support 2 to forwardly progress so as to visualize the superimposition of a colored layer 6 in the window 14 on the skin of the back of her hand in order to see the visual rendition and to be able to choose a hue which is suitable for her, and thus an associated cosmetic product.

Figure 16:
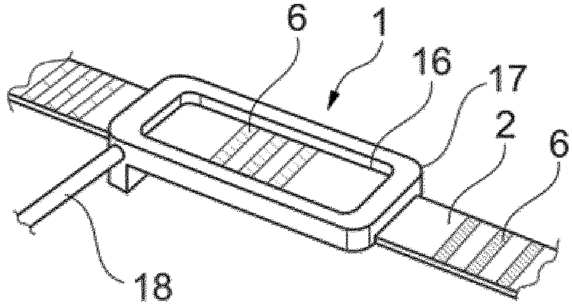
FIG. 16 represents, partially, diagrammatically and in perspective, another example of color chart according to the invention, FIG. 17 diagrammatically represents the use of the color chart of FIG. 16.
Figure 17:
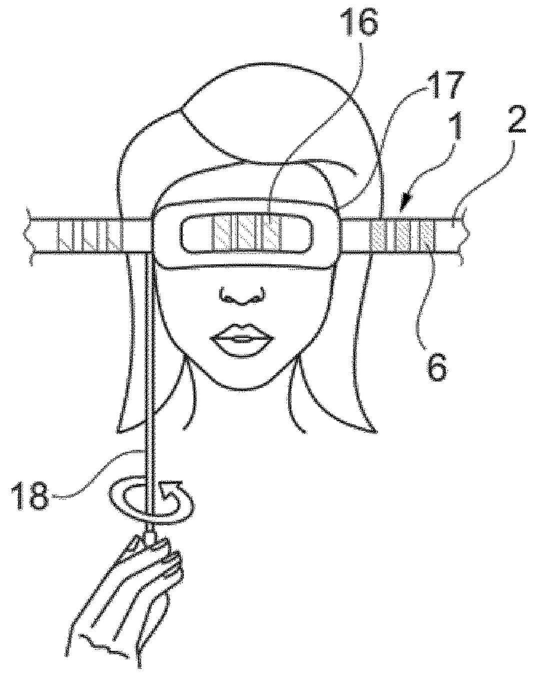

In FIGS. 16 and 17, the color chart 1 comprises a transparent or translucent support 2 in the form of a strip which can forwardly progress in a traversing window 16, which window 16 is formed by a frame of a support part 17 connected to a rod 18 which can be held in the hand by a user. The transparent or translucent support 2 comprises prints of colored layer 6 visible in the window 16. As illustrated in FIG. 17, the rod 18 can be held in the hand by a user, in a manner of a Venetian mask, so that the support part 17 rests on the forehead of the user and makes it possible to visualize, through the window 16, the visual rendition of the superimposition of the white-colored layer 5 and colored layer 6 assembly and of the skin of the forehead. The color chart 1 is designed so as to make it possible, by rotating the rod around itself, for the transparent or translucent support 2 to forwardly progress in the frame of the support part 17 in order to visualize the rendition of other colors of colored layers 6.

Figure 18:
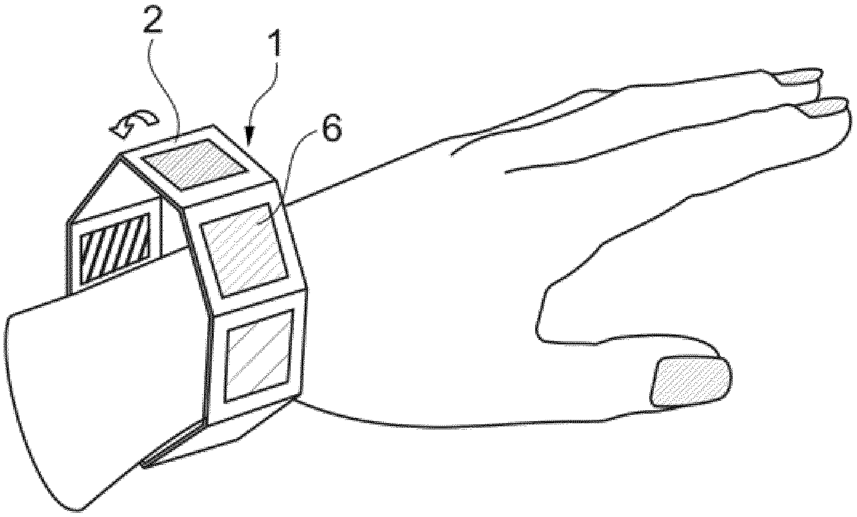
FIG. 18 represents, partially, diagrammatically and in perspective, another example of color chart according to the invention.

FIG. 18 illustrates the possibility of producing the color chart 1 in the form of a bracelet with different facets 21 formed by the transparent or translucent support 2, the facets 21 carrying different respective colors of colored layer 6. By superimposing each facet 21 on the skin of the wrist, the rendition of the superimposition between the skin at this spot and the color of the colored layer 6 of the facet 21 under consideration is displayed.

Figure 19:
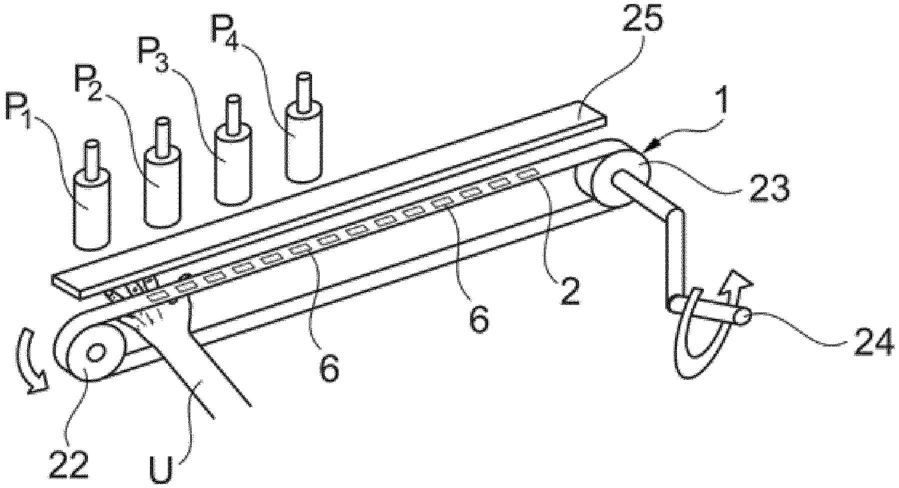
FIG. 19 represents, partially, diagrammatically and in perspective, another example of color chart according to the invention and its use.

The example illustrated in FIG. 19 shows a color chart 1 comprising a transparent or translucent support 2 in the form of a closed strip mounted stretched around two extremal small wheels 22 and 23, one of which, 22, is free in rotation and the other of which, 23, is controlled in rotation using an operating handle 24, so as to make it possible to cause the transparent or translucent support 2, provided with different colors of colored layers 6, to forwardly progress. An LED strip light 25 is provided, so as to illuminate the upper part of the strip which is progressing forward. A user slides her hand U into the space made by the width of the small wheels 22 and 23, so as to move her hand U nearer under the transparent or translucent support 2 and to visualize the rendition of the superimposition of the skin of the hand U with each colored layer 6.

Figure 20:
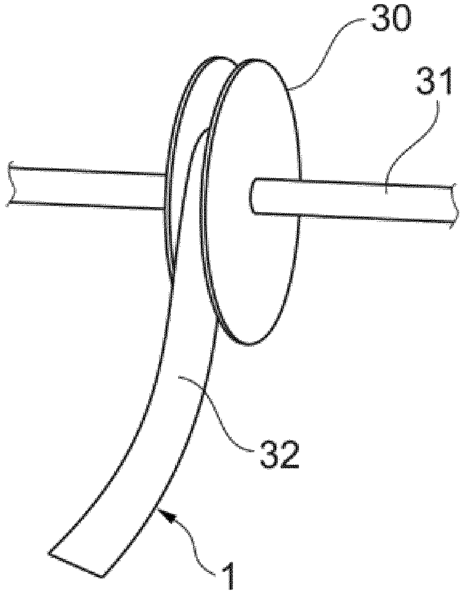
FIG. 20 represents, partially, diagrammatically and in perspective, another example of color chart according to the invention, FIG. 21 partially represents a transparent or translucent support for the color chart of FIG. 20.
Figure 21:
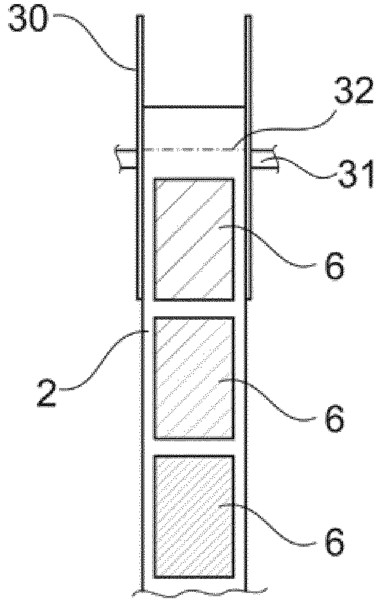

Finally, in the embodiment of FIGS. 20 and 21, the color chart 1 comprises a distributor roller 30 of a transparent or translucent support 2 in the form of a strip of flexible polymer film, the distributor roller 30 being mounted in rotation on an axle 31 and making possible the distribution of the transparent or translucent support 2. Precuts 32 are provided on the transparent or translucent support 2 in order to make it possible to detach a portion of transparent or translucent support 2. Each portion of transparent or translucent support 2, between two precuts 32, can comprise a plurality of different colors of colored layers. All the portions of transparent or translucent support 2 can comprise the same series of colors of colored layers 6. A user can detach a portion of transparent or translucent support 2 in order to be able to use the color chart 1 at another spot, in particular a distant one. In this embodiment, several, for example four, distributor rollers 30 can be arranged side by side on the axle 31, each comprising a range of particular, preferably similar, hues.

It would not be departing from the scope of the invention for the color chart 1 to be provided in another form. In particular, the color chart 1 can comprise a transparent sheet forming the transparent or translucent support 2, detachable from a magazine and carrying at least one, preferably several, prints of white-colored layer 5 and of colored layer 6.

The choice can be made at a sales outlet or from a distance.

The pivot-forming axle 3 can be replaced by a ring, a tie or any other type of fastener, removable or not.

Several printing passes can be carried out in order to produce the white-colored layer 5 and the colored layer 6, in particular as a function of the thickness desired.

Figure 23:
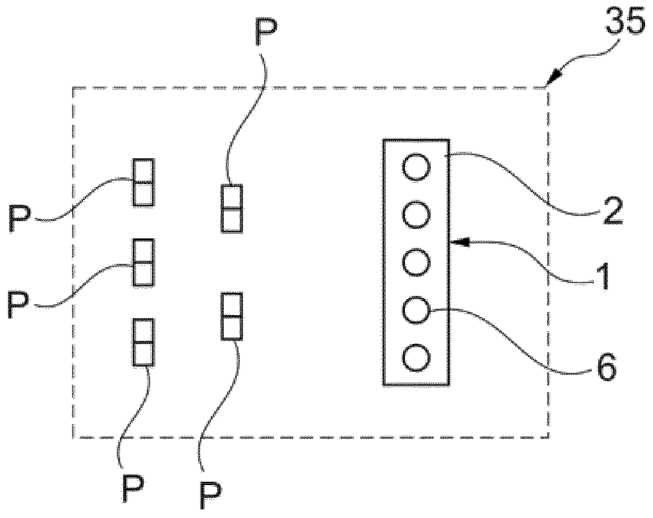
FIG. 23 is a diagrammatic view of an assembly according to the invention.

There has been represented, in FIG. 23, an assembly 35 according to the invention comprising a range of cosmetic products P, presented in their containers, with different respective hues and at least one color chart 1 with the corresponding hues.

In place of one color chart, it is possible to have a range 20 of color charts 1, as illustrated in FIG. 13, in particular in the case of a large number of cosmetic products with different respective hues.

Figure 24:
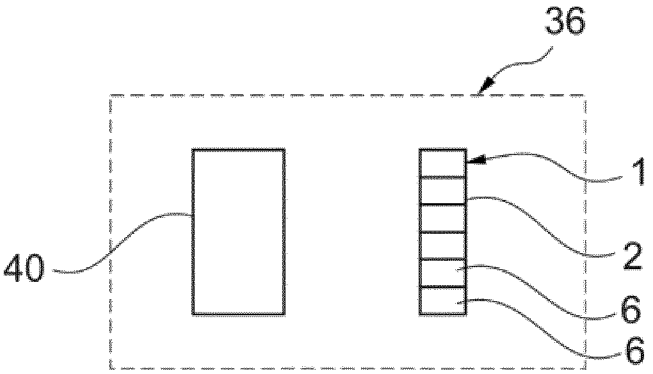
FIG. 24 is a diagrammatic view of another assembly according to the invention.

There has been represented, in FIG. 24, an assembly 36 of a color chart 1 and of a tailor-made formulation device 40 which is capable of producing the formulation of the cosmetic product, the hue of which has been chosen subsequent to the use of the color chart.

Figure 25:
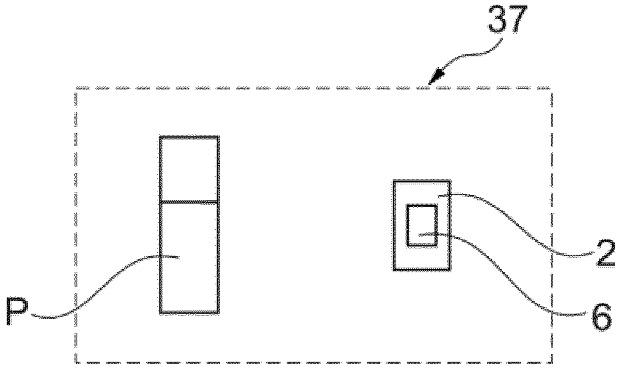
FIG. 25 is a diagrammatic view of another assembly according to the invention.

There has been represented, in FIG. 25, an assembly 37 comprising a cosmetic product P, present in its container, and a transparent or translucent support printed with a white-colored layer and a colored layer, so as to visualize the effect of the cosmetic product applied to the skin.

The invention claimed is:

1. A color chart for helping in the choice of a cosmetic product chosen within a range of cosmetic products having different respective hues, the color chart comprising at least one transparent or translucent support and, for at least one of said hues, at least one non-opaque, white-colored layer and at least one non-opaque, colored layer superimposed on the white-colored layer such that the difference in colors between the color as it appears on looking at the color chart as a result of the printed layers and a hue of a corresponding cosmetic product of said range of cosmetic products which it is desired to reproduce, expressed as Delta E 2000, is less than 2, the white-colored and colored layers being printed on the transparent or translucent support, the white-colored layer being in contact with the transparent or translucent support, the colored layer being in contact with the white-colored layer and being printed on the white-colored layer.

2. The color chart as claimed in claim 1, in which the colored layer and the white-colored layer are such that the difference in level of coverage between the printed color and an applied layer of the cosmetic product of the corresponding hue which it is desired to reproduce, expressed as contrast ratio CR %, is less than or equal to ±15%.

3. The color chart as claimed in claim 1, comprising a plurality of transparent supports, which are connected together the transparent supports being printed with respective colored layers of different colors.

4. The color chart as claimed in claim 1, in which said at least one transparent or translucent support comprises a flexible polymer film or a rigid or semirigid polymer sheet, said at least one transparent or translucent support comprising at least one polymer chosen from a polyethylene, a polyacrylic, a polyvinyl chloride, a polyester, a polycarbonate or a polyethylene terephthalate (PET).

5. The color chart as claimed in claim 1, in which the white-colored and colored layers form at least one pattern or at least one opening on the transparent or translucent support, in order to make it possible to see through the transparent or translucent support, in zones devoid of white-colored and colored layers.

6. The color chart as claimed in claim 1, in which the color chart is in a form chosen from the group consisting of a roll, a bracelet, a forehead mask, a retaining ring, a flower with petals, a detachable page, and a portion of a packaging.

7. The color chart as claimed in claim 1, comprising a layer of a varnish covering all of the superimposed white-colored and colored layers.

8. A range of color charts, comprising a plurality of color charts as claimed in claim 1, each color chart comprising a range of hues.

9. A method for choosing a cosmetic product within a range of cosmetic products having different respective hues, by using the color chart as claimed in claim 1, comprising the following stages:

superimposing the color chart on the skin, observing the color chart thus superimposed on the skin, and choosing the hue and thus the corresponding cosmetic product.

10. The method as claimed in claim 9, comprising a preliminary stage consisting of choosing a color chart within a range of color charts, each color chart being as claimed in claim 1 and comprising a range of hues.

11. An assembly of a range of cosmetic products with different respective hues and of at least one color chart as claimed in claim 1, or of a range of color charts, each color chart as claimed in claim 1 and comprising a range of hues.

12. The color chart as claimed in claim 1, in which the colored layer- and the white-colored layer are such that the difference in colors between the color as it appears on looking at the color chart as a result of the printed layers and the hue of the corresponding cosmetic product which it is desired to reproduce, expressed as Delta E 2000, is less than 1.

13. A method for the manufacture of a color chart for helping in the choice of a cosmetic product chosen within a range of cosmetic products having different respective hues, comprising the following stages, carried out for at least one of said hues:

a) printing, on a transparent or translucent support and in contact with the transparent or translucent support, a non-opaque white-colored layer, and b) printing, on the non-opaque white-colored layer and in contact with the non-opaque white-colored layer, a non-opaque, colored layer, the white-colored layer and the colored layer being printed so as to be superimposed to one another, the color of the colored layer superimposed on the white-colored layer being such that Delta E 2000 between the color of the colored layer superimposed on the white-colored layer and the color of the at least one of said hues is less than 2.

14. The method as claimed in claim 13, in which at least one of the thickness of the white-colored layer or the color of the colored layer are chosen so that the difference in level of coverage between the printed non-opaque white-colored and non-opaque colored layers and an applied layer of the cosmetic product of the corresponding hue, expressed as difference in contrast ratio CR %, is less than or equal to ±15%.

15. The method as claimed in claim 13, stages a) and b) being carried out in this order so that step b) is carried out after drying the non-opaque white-colored layer.

16. The method as claimed in claim 13, further comprising employing, for the printing in stages a) and b), an inkjet printer comprising a white ink.

17. The method as claimed in claim 13, comprising the following stages:

(a') applying a cosmetic product of one of said hues to an evaluation device comprising at least two regions respectively colored white and black, (b') carrying out at least one measurement on the at least two regions, so to calculate the level of coverage and the color of the hue on the evaluation device, (c') carrying out at least one printing for the hue, according to steps a) and b) of claim 10, (d') positioning the transparent or translucent support comprising the printed layers on at least the region colored white of a virgin evaluation device different from the previous evaluation device and carrying out at least one measurement on the non-opaque colored layer superimposed on the white-colored layer in order to calculate the color and optionally the level of coverage of the colored layer superimposed on the white-colored layer on the transparent or translucent support, (e') comparing the levels of coverage calculated in stages b') and d'), so as to calculate the Delta E 2000 or the contrast ratio % CR between the hue of the applied cosmetic product and the printed color, (f') choosing, for at least said hue or for an assembly of hues, a thickness of the white-colored layer and/or adjusting the printing color of the colored layer so that the Delta E 2000, between the hue applied to the evaluation device and the color of the colored layer superimposed on the white-colored layer, is less than 2 or that the difference in contrast ratio % CR is less than or equal to #15%, in order to produce the color chart.

18. The method as claimed in claim 13, further comprising a step of addition of at least one layer of varnish to the colored layer after step b).

* * * * *